Feb. 27, 1968  KIYOSHI INOUE  3,371,022

LOW-ELECTROLYTE-PRESSURE ELECTROCHEMICAL MACHINING

Filed March 18, 1964  5 Sheets-Sheet 1

KIYOSHI INOUE
INVENTOR.

BY Karl J. Ross
AGENT

Feb. 27, 1968

KIYOSHI INOUE 3,371,022

LOW-ELECTROLYTE-PRESSURE ELECTROCHEMICAL MACHINING

Filed March 18, 1964

INVENTOR
KIYOSHI INOUE

Karl F Ross

AGENT

Feb. 27, 1968   KIYOSHI INOUE   3,371,022
LOW-ELECTROLYTE-PRESSURE ELECTROCHEMICAL MACHINING
Filed March 18, 1964   5 Sheets-Sheet 4

KIYOSHI INOUE
INVENTOR.

BY
Karl F. Ross
AGENT

Feb. 27, 1968     KIYOSHI INOUE     3,371,022
LOW-ELECTROLYTE-PRESSURE ELECTROCHEMICAL MACHINING
Filed March 18, 1964     5 Sheets-Sheet 5

KIYOSHI INOUE
INVENTOR.

BY Karl F. Ross

AGENT

United States Patent Office 3,371,022
Patented Feb. 27, 1968

3,371,022
LOW-ELECTROLYTE-PRESSURE ELECTRO-CHEMICAL MACHINING
Kiyoshi Inoue, 182 3-chome Tamagawagoga-machi, Setagaya-ku, Tokyo, Japan
Filed Mar. 18, 1964, Ser. No. 352,907
Claims priority, application Japan, Mar. 19, 1963, 38/14,740; Mar. 27, 1963, 38/15,626; Apr. 23, 1963, 38/21,272; May 20, 1963, 38/26,690
5 Claims. (Cl. 204—143)

My present invention relates to electrochemical machining wherein a conductive workpiece is juxtaposed with a tool electrode in the presence of an electrolyte, and material from the workpiece is electrolytically eroded by the passage of a substantially unidirectional current through the working gap. The present invention is an extension of the principles set forth in my copending applications Ser. Nos. 19,685 filed April 4, 1960, now Patent No. 3,223,603 and 316,955 filed October 17, 1963.

A major problem involved in the use of conventional electrochemical machining techniques has been the requirement that elevated electrolyte pressures be maintained in the region of the working gap all during the passage of the electric current and indeed it has been suggested that a pressure of at least 2.5 to 3 kg./cm.² (i.e. about 40–45 lb./sq. in.) is essential in order to obtain any effective machining by electrolytic processes. These elevated pressures have been attained heretofore by supplying the electrolyte to the workpiece at high velocities and in large volumes, maintaining extremely small machining gaps, and combinations of these techniques. Presumably the high pressures are required to insure uniform current flows through the electrolyte within the gap, rapid elimination of eroded materials and equalization of the thermal conditions in the region of the gap as well as reduction in temperature so that "boiling" does not occur in the gap. Such high pressures, however, result in relatively large machining inaccuracies with respect to the parallelness of the walls of cavities produced by electrolytic machining and the sharpness of corners obtained by the process while increasing the cost of the machining operation both with respect to the capital expenses for high-pressure and high-volume pumps and the power and electrolyte costs. It has, therefore, been a predominant subject for research in the electrochemical-machining art to eliminate the aforementioned disadvantages and thereby increase both the accuracy of the machining operation and its speed while simultaneously decreasing the equipment cost and complexity.

It is the principal object of the present invention, therefore, to provide an improved method for electrochemically machining conductive materials.

It is another object of this invention to provide a method for the electrolytic erosion of conductive workpieces whereby the abovementioned disadvantages can be reduced if not entirely eliminated.

Still another object of this invention is to provide an improved method of electrolytically machining conductive workpieces over large surface regions as well as of machining annular workpieces.

A further object of this invention is to provide apparatus for carrying out the abovementioned methods efficiently and with a minimum of capital expense.

Still another object of this invention is to provide apparatus for machining conductive workpieces whereby the detritus of the machining process can be removed effectively while there exists little possibility for oxidation of the workpiece.

These objects and others which will become apparent hereinafter have been attained, in accordance with the present invention, by a method of electrochemically machining conductive workpieces which is based upon the discovery that entremely low electrolyte pressures can be employed during the actual machining process while the temperature conditions necessary for proper machining and the rate of renewal of electrolyte relative to the machining operation can be maintained when the current flow across the machining gap is periodically reduced substantially, preferably to zero, while electrolyte flow is maintained through the gap. For the purposes of the present invention, reference will be made to current and electrolyte flow rates (i.e. current and volume flow per unit of time) since it is contemplated, according to a specific feature of this invention, to maintain a relatively low electrolyte flow rate (which may be near to zero and at any event is substantially below about 3 kg./cm.² electrolyte pressure and may be between 1 and 2.5 kg./cm.²) during periods of maximum current flow and relatively high electrolyte flow rates during periods of relatively low current flow. The rate of electrolyte flow, although maintained substantially constant in an absolute sense, may thus be considered to vary with respect to the electric current flow per unit of time. During interruptions of the current flow the ratio of electrolyte flow (in terms of volume per unit time) to current flow (in terms of amperes per unit time) will thus be relatively high whereas, during the principal machining periods, this ratio will be relatively low. In other words, the present invention resides, in part, in the provision of an electrochemical machining method wherein the abovementioned ratio changes substantially periodically during the machining process with the electrolyte pressure in the working gap not exceeding about 3 kg./cm.² during periods in which this ratio is at its minimum (i.e. the periods of maximum machining). These results can be obtained by reducing the machining current to a minimum value (which may be zero) during constant electrolyte flow at low pressure, by relative retraction of workpiece and electrode to increase the interelectrode spacing and diminish the current flow, by providing a plurality of electrode surfaces successively brought into a working position proximal to the workpiece and then withdrawn therefrom, by interrupting the electrolyte-flow rate, or pulsing the latter. I have found that the periods in which this ratio is small should be from 0.3 to 3 times as long as the periods in which the ratio is large. Thus, when the periodic ratio change is obtained by use of a pulsating direct current, the ON time $t_a$ of the machining current should be in a ratio to the OFF time of $$\frac{t_a}{t_b} = 0.3 \text{ to } 3$$

The interruptions or alternations can take place between 50 and 3000 times per second with advantage. This system results in a marked improvement of the parallelness of the walls of a cavity sunk into the workpiece as well as in an improvement in the sharpness of corners obtained by this technique. A reduction of up to 50% in the electrolyte-flow rate, above the flow rate utilizing a constant ratio as indicated, can be obtained while an electrolyte pressure of substantially 1 to 25 kg./cm.² is used in the gap without difficulty.

According to another feature of the present invention, the corner-forming character of the machined workpiece can be still further improved by maintaining a blanket of a dielectric liquid (e.g. a nonconductive medium such as kerosene, light machine oil or the like) above the electrolyte so as to increase the head applied at the gap and yet facilitate the removal of the detritus from the region of the gap. Preferably, the dielectric liquid, a catenary organic compound, is forced through the electrolyte therebelow at an elevated pressure to entrain the eroded particles along with the electrolyte from which the particles may then be removed. The dielectric blanket limits oxidation or other corrosive activities and may, according to the principles set forth in my copending application Ser. No. 254,360, filed January 28, 1963, contribute organic fragments which are synthesized during the passage of the dielectric through the electrolyte vessel into larger molecules in the region of the machining operation by virtue of the high velocity of the erosion jet. The molecules formed in this manner appear to have some kind of surface activity since they promote foaming of the dielectric and facilitate the buoying of the particles removed from the working area. The particles are then carried into the foam atop the dielectric liquid which can be removed to permit extraction of the particles.

Still another feature of this invention resides in the concurrent introduction of the dielectric liquid and the electrolyte into the region of the working gap. I have found that optimum machining results can be obtained when the stream of electrolyte employed for the machining process is surrounded by a liquid sheath of the dielectric, both streams emerging from coaxial apertures of a common discharge nozzle. While the nozzle can be provided by the electrode tool itself, as described in my above-identified copending applications relating to electrochemical machining, it is an important aspect of the present invention that the nozzle be provided adjacent the electrode for directing the streams of dielectric and/or electrolyte laterally into the working gap. Again, removal of eroded material is facilitated while corrosion is prevented. In one embodiment of this feature of the invention, the electrochemical machining device is formed as a lathe in which the workpiece is rotated at a relatively high rate and the electrode is fed progressively into the workpiece in the radial direction while electrolyte and, if desired, dielectric liquid enters the working gap through the electrode. Alternatively, a separate nozzle for discharge of electrolyte and dielectric in a tangential direction can be employed.

The above and other objects, features and advantages of the present invention will become more readily apparent from the following description and examples, reference being made to the accompanying drawing in which.

Figure 1:
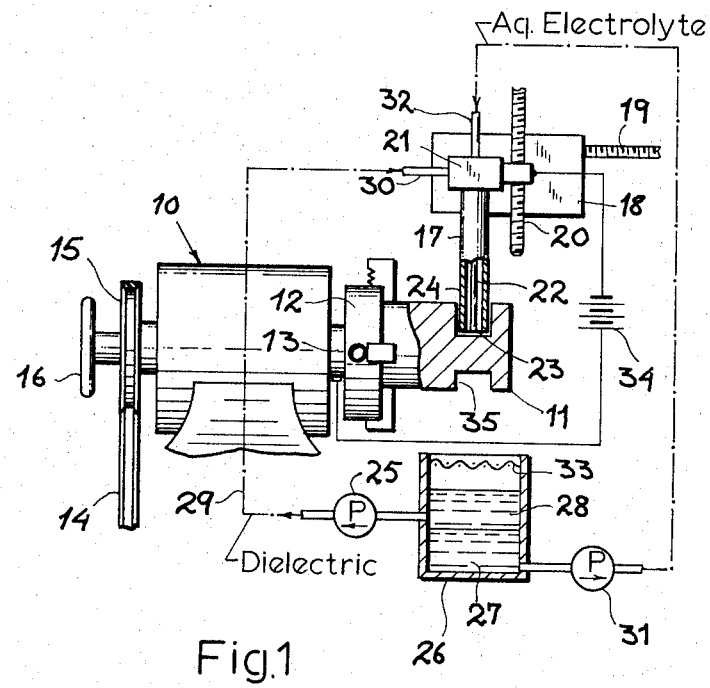
FIG. 1 is a side-elevational view, partly in cross-section, diagrammatically illustrating a lathe for the electrochemical machining of a rotary workpiece according to the present invention.

In FIG. 1 of the drawing, I show the headstock 10 of a lathe for the electrochemical machining of an annular workpiece 11 which is eccentrically held in a universal chuck 12 carried by the rotating spindle 13 of the lathe. The spindle 13 is driven by a belt 14 via a V-pulley 15 in the usual manner and can be provided with a hand wheel 16 for rotation when the power is cut off. In this case, the tool 17 consists of an electrode mounted upon a carriage 18 which is longitudinally shiftable parallel to the axis of the workpiece by a first leadscrew 19, the carriage 18 being provided with a second leadscrew 20 for displacing the cross-slide 21 of the tool 17. The latter can be composed of brass or copper, as described in my above-identified copending applications relating to electrochemical machining and is formed with an inner tube 22 for delivering electrolyte to the working gap 23 and a coaxial outer chamber 24 by means of which a dielectric-liquid sheath or shell is formed around the electrolyte stream. The dielectric liquid, which can be machine oil but preferably is kerosene, is circulated by a pump 25 from a reservoir 26 in which the electrolyte forms a layer 27 below the layer 28 of dielectric medium.

The pump 25 communicates, via a conduit 29, with the inlet 30 of chamber 24 while another pump 31 serves to displace electrolyte in a continuous stream from the reservoir 26 to the electrode inlet 32. The reservoir 26 can be disposed beneath the workpiece 11 so as to catch the oil and electrolyte cascading therefrom and is provided with filter means such as the screen 33 for catching eroded particles.

A source 34 of direct current is connected between the workpiece 11 and the electrode tool 17. When it is desired to machine an annular groove 35 in the workpiece 11, the latter is clamped in the chuck 12 and rotated at a relatively slow speed while the electrode 17 is advanced radially until a gap 23 (between 0.05 and 0.5 millimeter) is established, whereupon electrolyte and dielectric flow is commenced and the current of source 34 communicated to the electrode and workpiece. The movement of the workpiece permits machining with very low electrolyte pressures (1 to 2.5 kg./cm.$^2$) in the working gap. If it is desired to enlarge the groove, the electrode can be displaced longitudinally by screw 19. The dielectric liquid reduces corrosion of the workpiece in the region of the machining operation and improves the surface finish while serving to remove particles from the electrolyte by flotation. Suitable servo devices for driving the leadscrew 21 can maintain the proper gap size.

Figure 2:
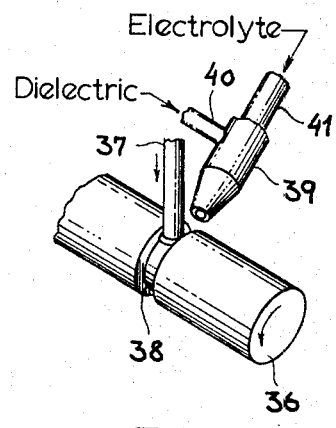
FIG. 2 is a perspective view illustrating the operation of another type of electrochemical-machining lathe.

In FIG. 2, I show a modification of the apparatus of FIG. 1 wherein the workpiece 36 can be mounted in the headstock of a lathe as previously indicated and cooperates with an electrode tool 37 connected in a direct-current circuit with the workpiece in the usual manner. In this case, however, the electrode is not tubular and merely serves as the counterelectrode for electrolyte erosion of the workpiece to produce the groove 38, the electrolyte being supplied tangentially to the machining gap by a nozzle 39. The electrolyte flow is thus transverse to the current flow between electrode and the workpiece and consists of an outer sheath of the dielectric liquid supplied to the nozzle via an inlet 40 and a central stream of electrolyte supplied via inlet 41 to this nozzle. Interruption or reduction of the current flow while the electrolyte and/or dielectric flow rate is maintained substantially constant can be effected by mechanical withdrawal of the electrodes 17 or 37 by the cross-slide 21. Automatic means can be provided for effecting such withdrawal. In general, however, it is preferred to periodically increase the electrolyte-flow-rate/current-rate ratio by diminishing the current flow to zero, i.e. by interruption of the machining current.

Figure 3:
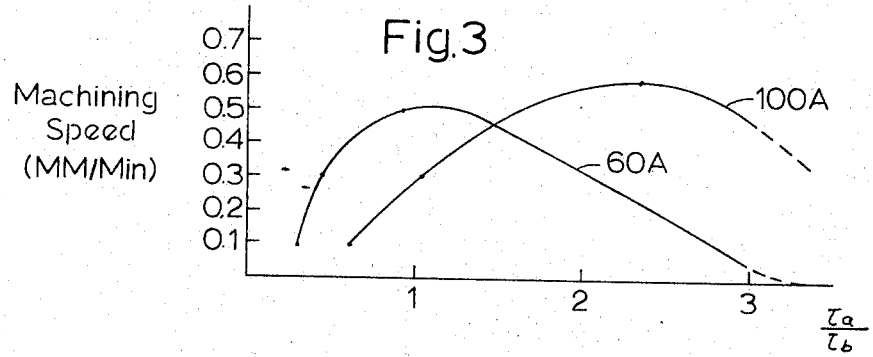
FIG. 3 is a graph illustrating the relationship between the ON-time/OFF-time ratio and machining speed.
Figure 4:
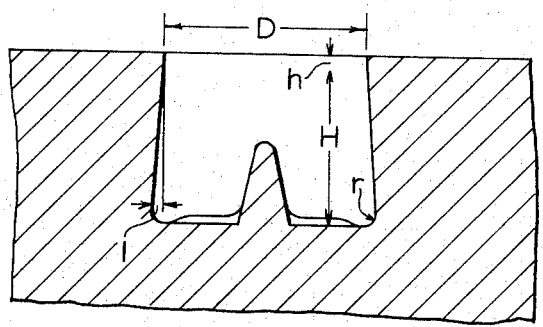
FIG. 4 is a cross-sectional view through a workpiece according to the present examples showing the various dimensions involved in the machining process.
Figure 3A:
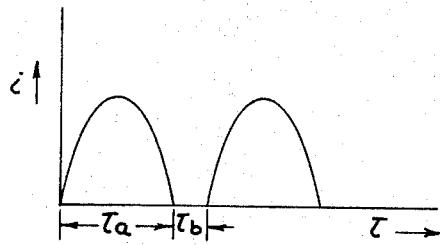
FIGS. 3A and 3B are further graphs illustrating the functioning of the present invention.
Figure 3B:
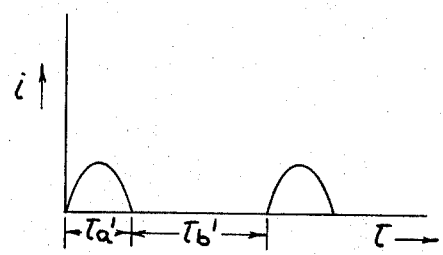

FIGS. 3, 3A and 3B are graphs illustrating the principles of the present invention.

Example I

Using an aqueous solution of sodium chloride as the electrolyte (specific gravity 1.17) and an electrolyte temperature of 30° C., a copper electrode, having an outside diameter of 25 mm. and an inside diameter of 8 mm. (see the electrode of FIG. 5) machined a carbon-steel (S55C) workpiece. The work gap was maintained between 0.05 and 0.10 mm. while an electrolyte pressure of 3 kg. per cm.$^2$ was used in the gap with a flow rate of 5–6 liters per minute. A peak voltage of 28 v. for the machining pulse was employed when the machining current was 60 amperes while the peak pulse voltage was 32 volts at 100 amperes machining current. The ratio of the electric-current pulse duration ($t_a$) to the period of interruption ($t_b$) was plotted (FIG. 3) for machining at 60 amperes and 100 amperes, respectively, against the machining speed in millimeters per minute. In FIGS. 3A and 3B I show systems in which the ratio $t_a:t_b$ is large and the ratio $t_a':t_b'$ is small, respectively. It has been found that optimum machining rates are obtained when the ratio ranges between substantially 0.3 and 3 for all usable current ranges. When the ratio of current ON time to current OFF time is equal to 1, the machining speed is approximately 0.5 mm. per minute, while a ratio of 2 gives about 0.35 mm. per minute for a current of 60 amperes. The relation diagrammatically illustrated in FIG. 3 holds for pulse-repletion frequencies of 50–3000 cycles per second. These pulses can be derived from electric superimposition and/or cancellation of half-wave, raw rectified alternating current or can be the unfiltered half-wave output itself. In general, it was found that pressures as low as 1–2.5 kg. per cm.$^2$ could be effectively maintained in the spark gap with a consequent increase in the electric current off-time (i.e. corresponding to a decrease in the ratio), the electrolyte flow during interruptions of the electric current being sufficient to prepare the gap for a subsequent passage of current with respect to temperature conditions, to remove eroded materials and to replace the depleted electrolyte.

Example II

When using the electrode and electrolyte as indicated in Example I, an electrolyte gap pressure of 2.5 kg. per cm.$^2$ was employed with 25 v. (peak) pulses at 50 cycles per second with a ratio $t_a:t_b=1$ and machining current of 350 amperes. Approximately 8–10 liters per minute of electrolyte flow was required and, in the sinking of a cavity with a diameter $D=25$ mm., a depth $H=17$ mm., and a marginal width $h$ of 3 mm. in S55C carbon steel, a deviation $l$ of the walls of the cavity from parallelness of 0.05 mm. was obtained. When the interrupted current was replaced by noninterrupted direct current at 12 v. and 350 amperes (i.e. essentially the same power as used for the interrupted current) an electrolyte pressure at the gap of 17 kg. per cm.$^2$ and a flow rate of about 14–20 l. per minute was required to sink the cavity at the same rate as that effected with interrupted current flow. A deviation $l$ of 0.15 mm. was obtained under these circumstances, however, and in general, the walls of the cavity were found to be rounded in contradistinction to the sharp corners and straight walls prevalent when the interrupted current was used. The machining gap ranged between 0.05 and 0.1 mm. while the temperature was 30° C.

Figure 5:
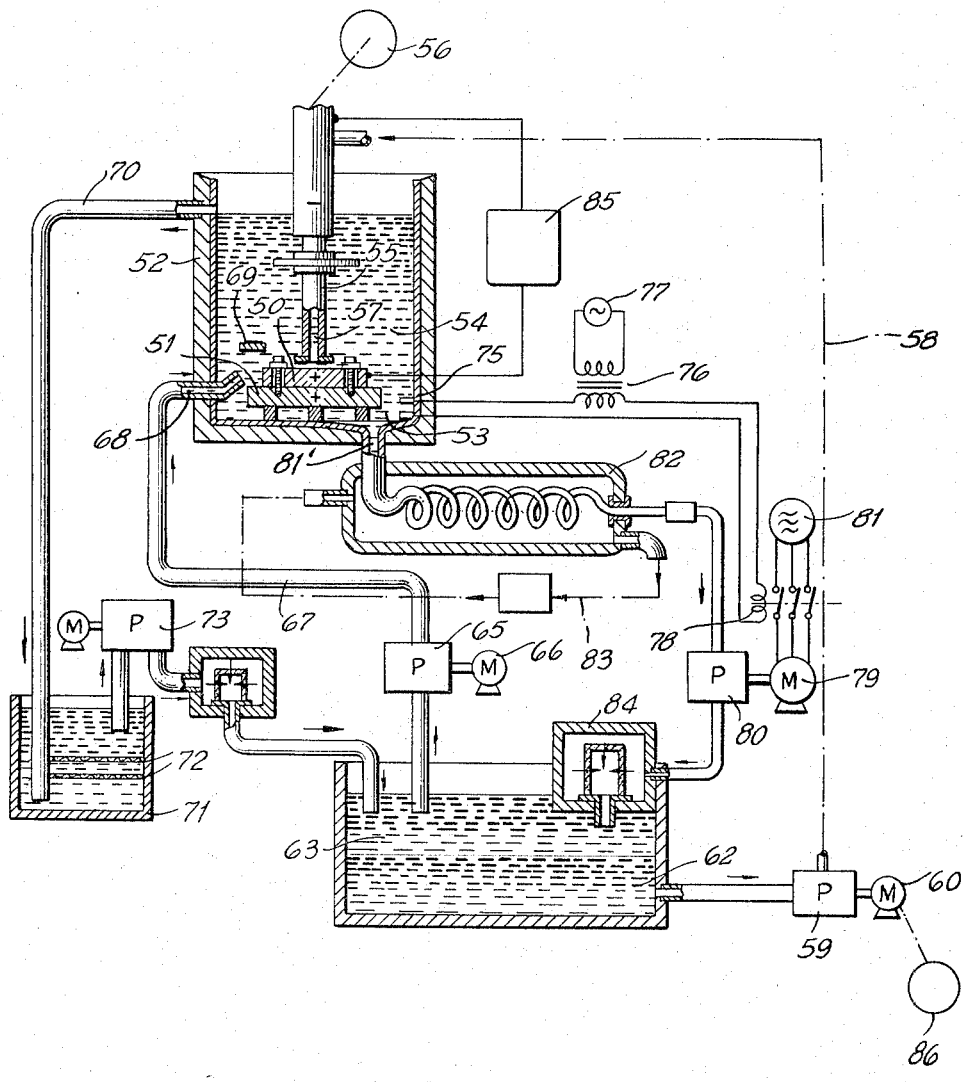
FIG. 5 is an axial cross-sectional view through an installation for machining the workpiece of FIG. 4, showing diagrammatically the electrolyte- and dielectric-circulating systems as well as the controls therefor.

In FIG. 5 I show another machining system wherein the workpiece 50 is secured to a platform 51 within a vessel 52 in which an electrolyte layer 53 forms below a layer 54 of dielectric liquid. The electrode 55 is advanced toward the workpiece by a conventional servo mechanism 56 responsive to the width of the gap and delivers electrolyte to the latter via its internal bore 57. The electrolyte is fed to the electrode 57 via a conduit 58 from a pump 59 driven by a motor 60 and communicating with a reservoir 61. In the latter, the aqueous saline electrolyte forms a lower level 62 carrying an upper level of a dielectric medium 63 (e.g. kerosene or light machine oil). The dielectric medium is drawn from the upper layer 63 via the suction pipe 64 of a pump 65, having a motor 66, the pressure line 67 of this pump terminating at the vessel 52 in a jet nozzle 68, adapted to direct a high velocity stream of, say kerosene, upwardly past and through the electrolyte cascading downwardly from the workpiece through the curtain of the dielectric medium.

A plate 69 can advantageously be disposed forwardly of the nozzle, the kinetic energy of the dielectric flow causing possible fragmentation of the dielectric liquid and its reformation into substances having surface-active qualities as evidenced by the substantial foaming resulting. The foaming dielectric medium entrains particles of the workpiece material eroded from the workpiece to the top of the liquid whence they are removed in the foam via a conduit 70. The dielectric liquid led from the vessel 52 via conduit 70 enters a filter chamber 71 in which the particles are removed by coarse screens 72 and the dielectric medium returned to the reservoir 61 via a pump 73 and a fine filter 74. The dielectric curtain above the work gap also facilitates removal of the particles by virtue of a flotation action. It has been observed that the eroded particles tend to serve as nuclei upon which gas bubbles (hydrogen or oxygen) are adsorbed, these gas bubbles buoying the metallic particles to the surface of the dielectric liquid curtain.

When the level of the dielectric liquid 53 within vessel 52 rises above a predetermined height as sensed by a conductivity cell 75, an electric current passes through the electrolyte between the electrode plates from a transformer 76, connected to a power source 77, and energizes a relay 78 to connect the motor 79 of a pump 80 to a source 81 of electric current. Excess electrolyte is then removed from the vessel 52 through an outlet 81 and led into a heat exchanger 82 through which a cooling is circulated as diagrammatically illustrated at 83. The electrolyte, reduced in temperature, then passes through a filter 84, for removal of any particles which have not been extracted by flotation, prior to entering the reservoir 61. The electrode 57 and the workpiece 50 are supplied with interrupted electric current by a source 85 which can be any conventional means for generating periodic unidirectional (i.e. direct current) pulses. The motor 60 of pump 59 can, if desired, be operated by a timer 86 for pulsing the electrolyte flow as previously described.

Figure 6:
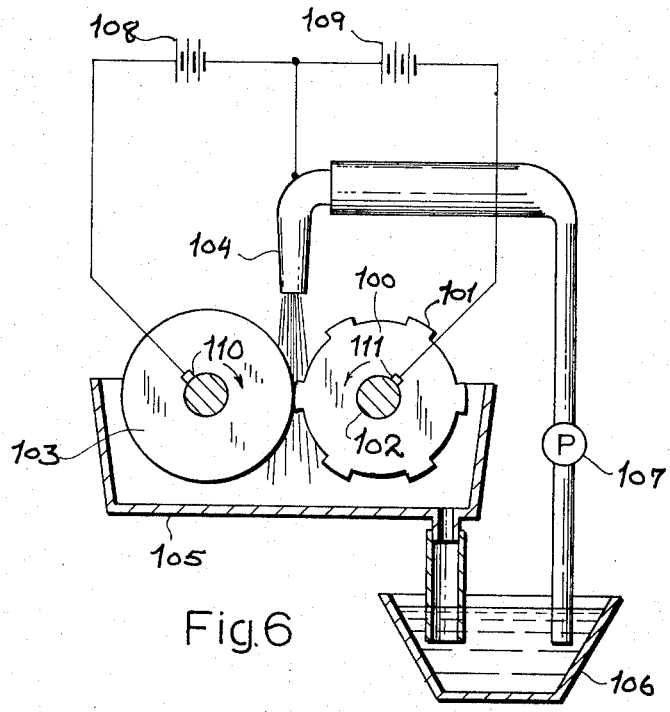
FIG. 6 is a cross-sectional view illustrating a modification of the machining system.
Figure 7:
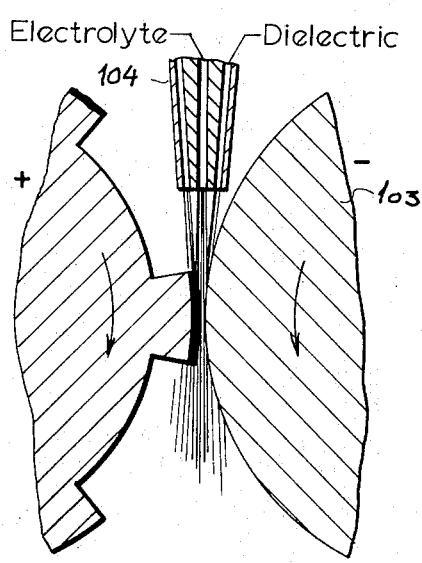
FIG. 7 is a detail view of a portion of the system of FIG. 6.

In FIGS. 6 and 7, I show another system for machining a conductive workpiece. In this system, the electrode 100 is provided with a plurality of angularly spaced machining surfaces centered about the axis of the electrode shaft 102. Rotation of shaft 102 successively brings the electrode surfaces into proximity with the rotatable workpiece 103. In this case electrolyte is delivered to the gap by a nozzle 104 and is collected at 105 for circulating to the nozzle via a reservoir 106 and a pump 107. The stream of electrolyte is introduced transversely to the direction of current passage through the gap and is surrounded by a sheath of dielectric medium emerging from the nozzle 104. The angular velocity of the electrode 100 is so selected with respect to the number of machining surfaces along its periphery that current flow is interrupted or reduced between 50–3000 times per second by rotation of the electrode. The unidirectional machining current is derived from a pair of batteries 108, 109 which are connected across the nozzle 104 and workpiece 103, and the nozzle and the electrode 100, respectively, via suitable brushes 110, 111 bearing upon the workpiece and electrode shafts.

Figure 8:
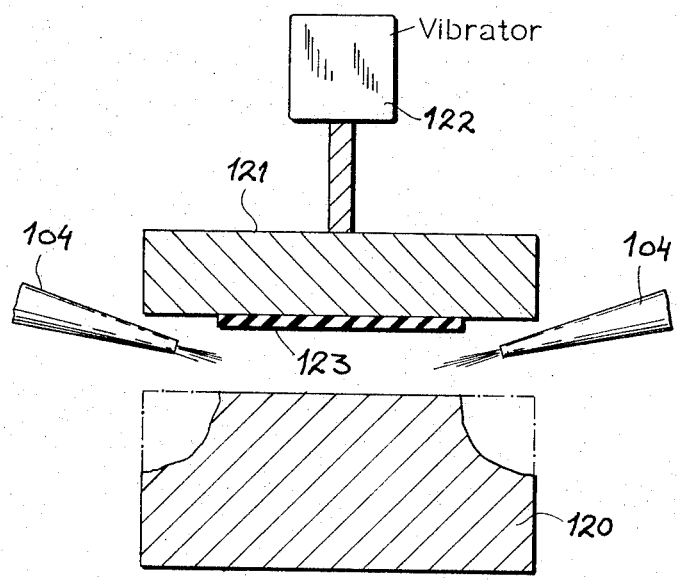
FIG. 8 is a cross-sectional view illustrating still another modification.
Figure 9:
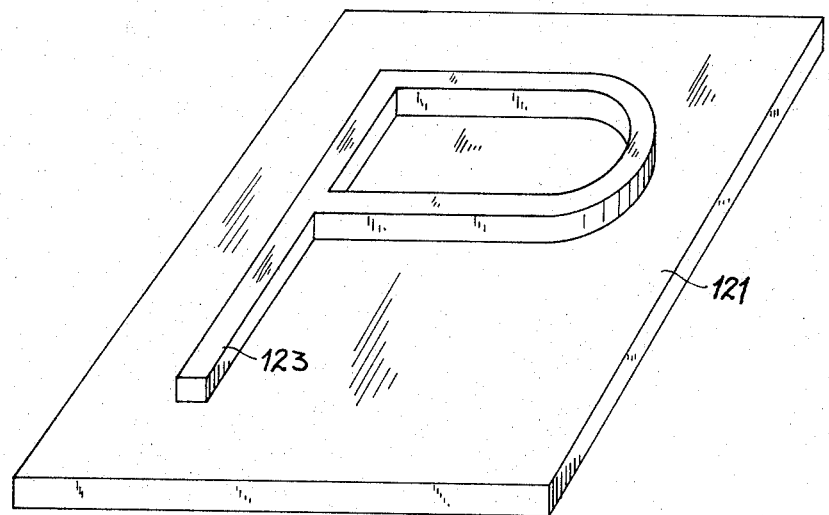
FIG. 9 is a perspective view showing the finished product resulting from the system of FIG. 8.

In FIGS. 8 and 9, I show still another arrangement in which electrolyte and dielectric liquids are coaxially injected into the machining gap of a system for the electrolyte machining of a workpiece. In this case, the workpiece 120 and the electrode 121 are moved relatively toward and away from one another by a vibrator 122 connected, for example, to the electrode 121. The latter is masked at 123 with a nonconductive layer (see FIG. 9)

so that machining occurs only in line with the nonmasked portions of the electrode surface. Two nozzles 104 are provided in this embodiment for introducing electrolyte in dielectric liquid into the variable gap. The electrode 121 is vibrated at 50 to 3000 vibrations per second, as previously indicated.

*Example III*

Using the system of FIG. 8 with a carbon-steel (S55C) workpiece 120 and a copper electrode 121 having confronting surface areas of 15 mm.$^2$ with a machining gap of 0.3 mm., aqueous sodium-chloride electrolyte (specific gravity 1.12) is introduced into the gap at a velocity of 15 mm. per second. A machining current of 100 amperes is employed at 15 v. A cavity having the configuration of the unmasked electrode portion is produced with a depth of 3 mm. after 12 minutes. There is a noticeable improvement in machining efficiency when the electrode 121 is vibrated at 100 cycles per second with a stroke of 0.5 mm. so that, at its maximum distance from the workpiece a gap of 0.8 mm. is formed. The electrolyte pressure can be substantially reduced in the gap while a maximum roughness of 1.5 microns is obtained.

Figure 10:
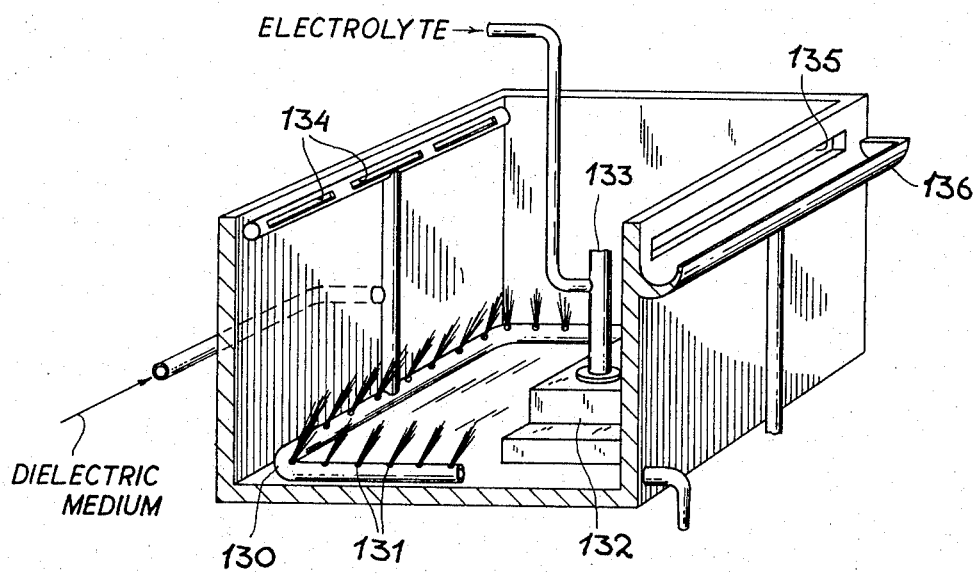
FIG. 10 is a perspective view of an electrochemical machining area illustrating the means for introducing dielectric liquid thereto.

In FIG. 10, I show a system generally similar to that of FIG. 5 wherein, however, the dielectric medium is introduced from a manifold 130 through a plurality of nozzles 131 in a rectangular array surrounding the workpiece 132 and the electrode 133. Another portion of the incoming dielectric medium is discharged in a sheet-like flow from slots 134 across the top of the electrolyte layer to flush the foam and particles at the top of this layer through an outlet slot 135 into a trough 136 from which the medium is led to a filtering and recirculating system as illustrated in FIG. 5. The electrolyte flow system can be similar to that of FIG. 5.

The invention described and illustrated is believed to admit of many modifications within the ability of persons skilled in the art, all such modifications being considered within the spirit and scope of the appended claims.

I claim:
1. An apparatus for electrochemically machining a conductive workpiece constituting a first electrode, said apparatus comprising a second electrode spacedly juxtaposed with said first electrode; a source of substantially unidirectional electric current connectable with said electrodes to render said first electrode positive relative to said second electrode; nozzle means for passing a continuous stream of a liquid electrolyte tangential to one of said electrodes and through the gap between said electrodes; and means for introducing a sheath of a liquid dielectric medium surrounding said stream and impinging on said electrodes at areas surrounding said gap for limiting side erosion.

2. An apparatus for electrochemically machining a conductive workpiece constituting a first electrode, said apparatus comprising a second electrode spacedly juxtaposed with said first electrode; a source of substantially unidirectional electric current connectable with said electrodes for rendering said first electrode positive relative to said second electrode; means for passing a stream of a liquid electrolyte through the gap between said electrodes; and means for maintaining a layer of a liquid dielectric above the electrolyte and spaced from the region of said gap while circulating said dielectric upwardly through said electrolyte to remove particles eroded from said workpiece from the region of said gap.

3. The combination as set forth in claim 2 in which said second electrode comprises a channeled member, said electrolyte stream is passed therethrough to said gap to immerse said electrodes in a layer and in which said last mentioned means comprises a plurality of orifices directed upwardly through said electrolyte layer.

4. The method of electrochemically machining a conductive workpiece, comprising the steps of:

constituting said workpiece as a first electrode and juxtaposing it spacedly with a second tool electrode, connecting a power source across said electrodes to render said first electrode positive relative to said second electrode, passing a continuous stream of a liquid electrolyte through said gap between said electrodes and immersing said electrodes in said electrolyte in an electrolyte layer, passing at least one stream of dielectric fluid of lower specific gravity than said electrolyte through said electrolyte layer at a point distal from said gap to remove eroded particles from said electrolyte layer and form a dielectric layer with entrained particles above said electrolyte layer.

5. The method of electrochemically machining a conductive workpiece, comprising the steps of:

constituting said workpiece as a first electrode and juxtaposing it spacedly across a gap with a second tool electrode having a channel formed therethrough and terminating in said gap, connecting a power source across said electrodes to render said first electrode positive relative to said second electrode, passing a stream of liquid electrolyte through said channel and immersing said electrodes in said electrolyte in an electrolyte layer, passing at least one stream of dielectric fluid of lower specific gravity than said electrolyte upwardly through said electrolyte layer at a point distal from said gap to remove eroded particles from said electrolyte layer and form a dielectric fluid layer with entrained particles above said electrolyte layer, removing dielectric fluid from said dielectric layer, and removing electrolyte fluid from said electrolyte layer.

References Cited

UNITED STATES PATENTS

| 2,385,198 | 9/1945 | Engle | 204—224 |
|-----------|--------|-------|---------|
| 3,058,895 | 10/1962 | Williams | 204—143 |
| 3,075,903 | 1/1963 | Costa et al. | 204—224 |
| 3,095,364 | 6/1963 | Faust et al. | 204—143 |
| 3,243,365 | 3/1966 | Aikin | 204—224 |

FOREIGN PATENTS

| 383,809 | 1/1959 | Japan. |
| 623,865 | 2/1963 | Belgium. |

OTHER REFERENCES

Horgan, American Machinist/Metalworking Manufacturing, vol. 106, No. 5, Mar. 5, 1962, pp. 81 and 82.

ROBERT K. MIHALEK, *Primary Examiner.*

JOHN H. MACK, *Examiner.*